United States Patent
Lin et al.

(10) Patent No.: US 10,252,156 B2
(45) Date of Patent: *Apr. 9, 2019

(54) CONTROL CIRCUIT OF MASTER-SIDE GAME CONSOLE FOR ENABLING MULTIPLE VIDEO GAME CONSOLES TO TOGETHER EMULATE SAME STANDALONE MULTIPLAYER VIDEO GAME THROUGH NETWORKING CONNECTION

(71) Applicant: Realtek Semiconductor Corp., Hsinchu (TW)

(72) Inventors: Chun-Hao Lin, Taoyuan City (TW); E-Cheng Cheng, Yunlin County (TW); Sheng-Kai Hung, Hsinchu County (TW); Chien-Kuo Cheng, New Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,445

(22) Filed: Dec. 7, 2017

(65) Prior Publication Data

US 2019/0030426 A1 Jan. 31, 2019

(30) Foreign Application Priority Data

Jul. 28, 2017 (TW) .............................. 106125622 A (51) Int. Cl.
*A63F 13/335* (2014.01)
*A63F 13/25* (2014.01)

(52) U.S. Cl.
CPC ............ *A63F 13/335* (2014.09); *A63F 13/25* (2014.09)

(58) Field of Classification Search
None
See application file for complete search history.

(56) References Cited

U.S. PATENT DOCUMENTS 8,808,081 B1 * 8/2014 Healy ................. G07F 17/3225
 463/16
9,050,533 B2 * 6/2015 Sasaki ..................... H04W 4/21
(Continued)

FOREIGN PATENT DOCUMENTS

TW 200515938 A 5/2005

*Primary Examiner* — Paul A D'Agostino
(74) *Attorney, Agent, or Firm* — Birch, Stewart, Kolasch & Birch, LLP (57) ABSTRACT

A control circuit of a master-side game console includes: a processor and a storage circuit for storing a computer program product. The processor is arranged to operably execute the computer program product to perform following operations: establishing networking connection between the master-side game console and a client-side game console; receiving master-side input values generated by an user control device of the master-side game console; receiving client-side input values transmitted from the client-side game console; generating a target instruction based on the master-side input values and the client-side input values; transmitting the target instruction and a pseudo clock indicator value to the client-side game console; executing the target instruction in a master-side emulating environment based on the pseudo clock indicator value; and rendering an updated master-side game screen according to execution results of the target instruction and displaying the updated master-side game screen on a display device.

8 Claims, 5 Drawing Sheets

(56) References Cited

U.S. PATENT DOCUMENTS

| | | | | |
|---|---|---|---|---|
| 2006/0003841 A1* | 1/2006 | Kobayashi | ............... | A63F 13/12 463/42 |
| 2008/0318679 A1* | 12/2008 | Tran | ..................... | A43B 3/0005 463/39 |
| 2009/0233675 A1* | 9/2009 | Shvili | ..................... | G07F 17/32 463/16 |
| 2012/0069131 A1* | 3/2012 | Abelow | ............... | G06Q 10/067 348/14.01 |
| 2012/0190443 A1* | 7/2012 | Fujisawa | ............... | A63F 13/422 463/31 |
| 2012/0190444 A1* | 7/2012 | Fujisawa | ................. | A63F 13/10 463/31 |
| 2013/0073336 A1* | 3/2013 | Heath | ..................... | G06Q 30/02 705/7.29 |
| 2013/0073388 A1* | 3/2013 | Heath | ..................... | G06Q 30/02 705/14.53 |
| 2014/0006127 A1* | 1/2014 | DeCook | ............. | G06Q 30/0226 705/14.17 |
| 2014/0052548 A1* | 2/2014 | Dokken, Jr. | ........... | G06Q 50/01 705/14.73 |
| 2017/0093848 A1* | 3/2017 | Poisner | ............... | H04L 63/0861 |

* cited by examiner

CONTROL CIRCUIT OF MASTER-SIDE GAME CONSOLE FOR ENABLING MULTIPLE VIDEO GAME CONSOLES TO TOGETHER EMULATE SAME STANDALONE MULTIPLAYER VIDEO GAME THROUGH NETWORKING CONNECTION

CROSS-REFERENCE TO RELATED APPLICATIONS

This application claims the benefit of priority to Patent Application No. 106125622, filed in Taiwan on Jul. 28, 2017; the entirety of which is incorporated herein by reference for all purposes.

BACKGROUND

The disclosure generally relates to a video game console and, more particularly, to a control circuit of a master-side game console for enabling multiple video game consoles to together emulate a same standalone multiplayer video game through networking connections.

Many standalone multiplayer video games announced in the era in which Internet was not so popular have become classic video games nowadays. Therefore, various software-based or hardware-based video game emulators have been developed to emulate the old fashion video game consoles or arcade machines so that modern users can enjoy those classic video games.

The user control mechanism of the old fashion video game consoles or arcade machines requires that the keyboards or joysticks manipulated by different players should be physically connected to the same video game machine. In other words, the old fashion video game consoles or arcade machines does not allow different users to play the same multiplayer video game together through networking connections. Accordingly, the players who want to play the same multiplayer video game together are thus required to be present at the same location (e.g., the same room) at the same time so as to play the same video game displayed on the same screen.

Internet related applications have become more and more popular, but traditional video game emulators still cannot enable players in different geographical locations to play the same old fashion multiplayer video game together due to the restriction of the original architecture of the old fashion video game consoles or arcade machines to be emulated. Apparently, this is a major bottleneck for the application flexibility of the traditional video game emulators.

SUMMARY

An example embodiment of a control circuit of a master-side video game console is disclosed. The master-side video game console comprises a transmission circuit, an user control device, and a communication circuit. The control circuit comprises a processor; and a storage circuit arranged to operably store a computer program product; wherein the processor is arranged to operably execute the computer program product to perform following operations: establishing a networking connection between the master-side video game console and a remote client-side video game console through the communication circuit; loading a target game image file into a master-side emulating environment created by the processor; receiving one or more master-side input values generated by the user control device based on an user's manipulations; receiving one or more client-side input values transmitted from the client-side video game console through a network; generating a target instruction based on the one or more master-side input values and the one or more client-side input values; generating a pseudo clock indicator value; utilizing the communication circuit to transmit the target instruction and the pseudo clock indicator value to the client-side video game console through the network; executing the target instruction in the master-side emulating environment based on the pseudo clock indicator value; and rendering an updated master-side game screen according to executing results of the target instruction and transmitting the updated master-side game screen to a master-side display device for displaying through the transmission circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
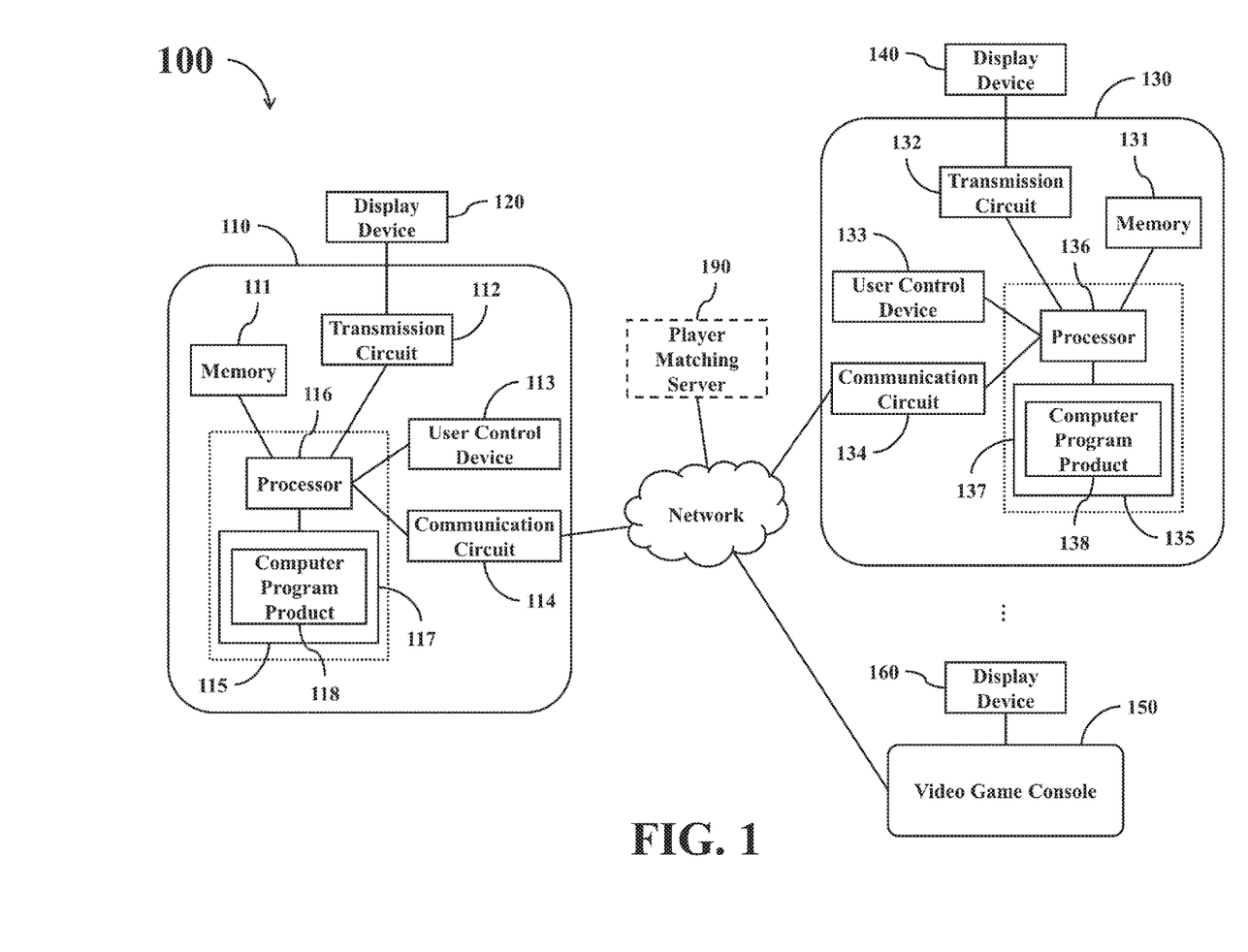
FIG. 1 shows a simplified functional block diagram of a video game emulating system according to one embodiment of the present disclosure.

FIG. 1 shows a simplified functional block diagram of a video game emulating system 100 according to one embodiment of the present disclosure. The video game emulating system 100 comprises multiple video game consoles (e.g., the exemplary video game consoles 110, 130, and 150 shown in FIG. 1) capable of communicating with each other through a network, and multiple display devices (e.g., the exemplary display devices 120, 140, and 160 shown in FIG. 1) respectively coupled with the multiple video game consoles. The aforementioned network may be realized with Internet or Intranet and may adopt various communication protocols.

Two or more video game consoles in the video game emulating system 100 may cooperate together through networking connections to conduct emulation operations of the same old fashion standalone multiplayer video game, so as to synchronously display the emulated results of the video game on different display devices in different geographical locations. This realizes a multiplayer gaming function that allows users in different geographical locations (e.g., different rooms, different buildings, different cities, or different countries) to play the same old fashion standalone multiplayer video game together, which is impossible for the traditional video game emulators.

The term "old fashion standalone multiplayer video game" used throughout the description and the claims refers to various old multiplayer arcade games, TV games, or PC games, which were originally designed to be executed on a standalone game console, able to allow multiple users to play the same video game together by manipulating the same video game console at the same location, but incapable of supporting multiple users in different geographical locations to together play the same video game through networking connections.

In the video game emulating system 100, the video game consoles have similar main architecture with each other. As shown in FIG. 1, for example, the video game console 110 comprises a memory 111, a transmission circuit 112, an user control device 113, a communication circuit 114, and a control circuit 115. The control circuit 115 comprises a processor 116 and a storage circuit 117, while the storage circuit 117 is stored with a computer program product 118. The video game console 130 comprises a memory 131, a transmission circuit 132, an user control device 133, a communication circuit 134, and a control circuit 135. The control circuit 135 comprises a processor 136 and a storage circuit 137, while the storage circuit 137 is stored with a computer program product 138.

In the video game console 110, the memory 111 is configured to operably store data required for the operations of the control circuit 115 or other circuits. The transmission circuit 112 is configured to operably transmit audio and video data to the corresponding display device 120 for displaying. The user control device 113 is configured to operably allow an user to input game control commands therefrom. The communication circuit 114 is configured to operably communicate data with other remote devices through the network. The control circuit 115 is coupled with the memory 111, the transmission circuit 112, the user control device 113, and the communication circuit 114. The processor 116 of the control circuit 115 is configured to operably execute the computer program product 118 stored in the storage circuit 117 so as to control the operations of the above components of the video game console 110.

In the video game console 130, the memory 131 is configured to operably store data required for the operations of the control circuit 135 or other circuits. The transmission circuit 132 is configured to operably transmit audio and video data to the display device 140 for displaying. The user control device 133 is configured to operably allow an user to input game control commands therefrom. The communication circuit 134 is configured to operably communicate data with other remote devices through the network. The control circuit 135 is coupled with the memory 131, the transmission circuit 132, the user control device 133, and the communication circuit 134. The processor 136 of the control circuit 135 is configured to operably execute the computer program product 138 stored in the storage circuit 137 so as to control the operations of the above components of the video game console 130.

Figure 2:
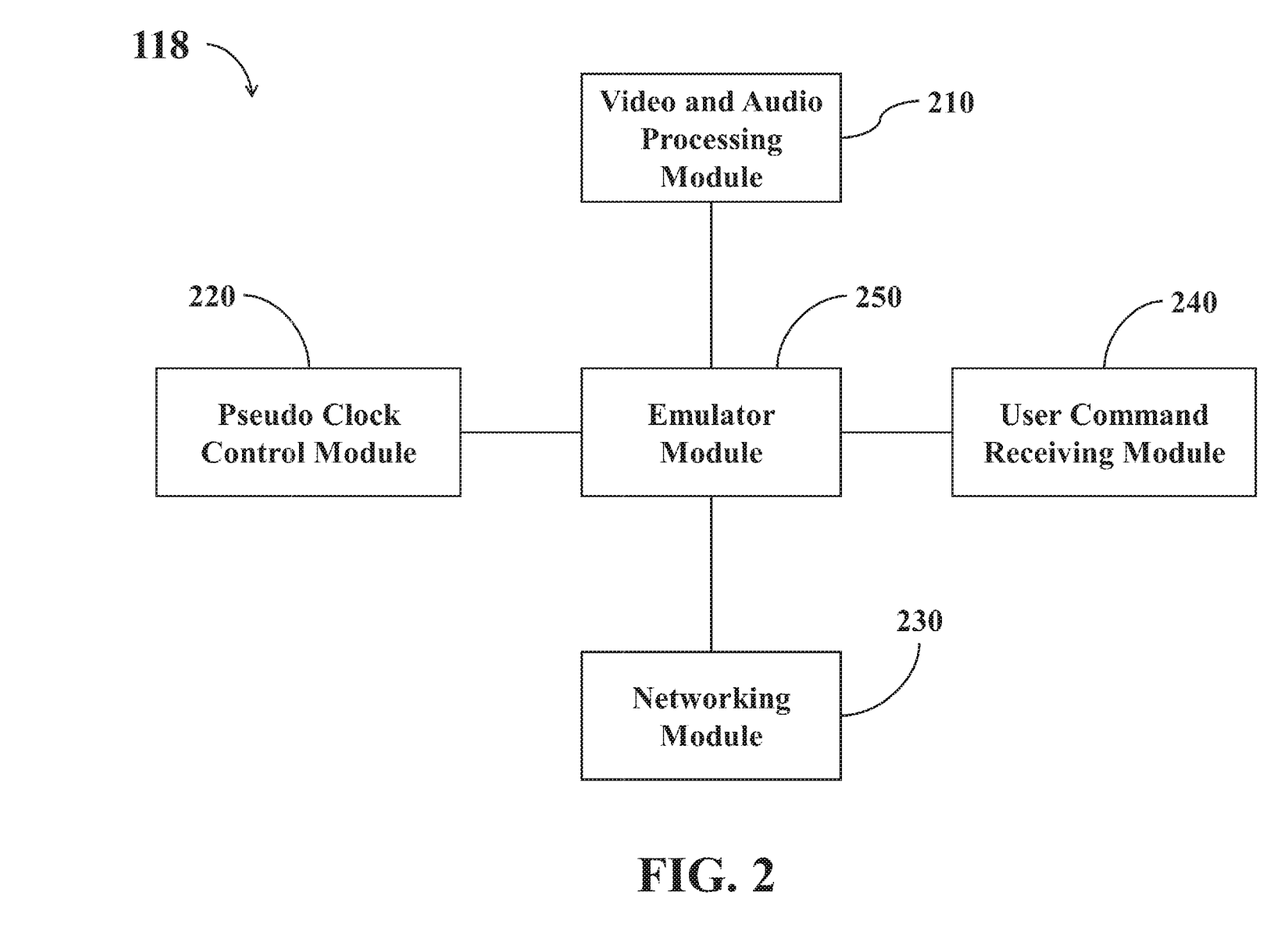
FIG. 2 shows a simplified functional module diagram of a computer program product stored in a master-side game console in FIG. 1 according to one embodiment of the present disclosure.

The computer program product 118 stored in the storage circuit 117 may be realized with one or more application program modules. For example, FIG. 2 shows a simplified functional module diagram of the computer program product 118 in FIG. 1 according to one embodiment of the present disclosure. In this embodiment, the computer program product 118 comprises a video and audio processing module 210, a pseudo clock control module 220, a networking module 230, an user command receiving module 240, and an emulator module 250.

Figure 3:
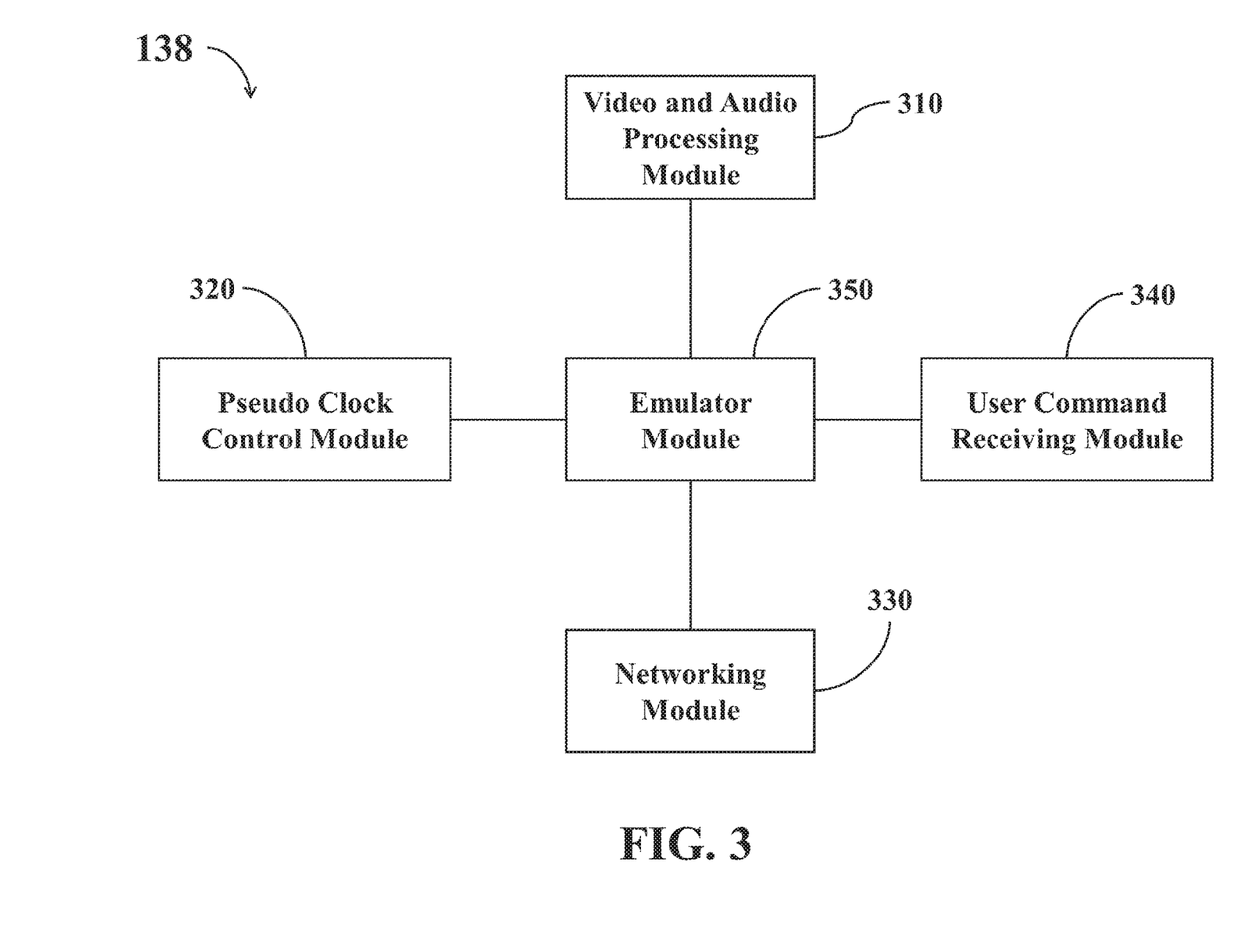
FIG. 3 shows a simplified functional module diagram of a computer program product stored in a client-side game console in FIG. 1 according to one embodiment of the present disclosure.

The computer program product 138 stored in the storage circuit 137 may be realized with one or more application program modules. For example, FIG. 3 shows a simplified functional module diagram of the computer program product 138 in FIG. 1 according to one embodiment of the present disclosure. In this embodiment, the computer program product 138 comprises a video and audio processing module 310, a pseudo clock control module 320, a networking module 330, an user command receiving module 340, and an emulator module 350.

In practice, each of the memories 111 and 131 may be realized with an appropriate volatile memory circuit or non-volatile memory circuit. Each of the transmission circuits 112 and 132 may be realized with an appropriate audio and video transmission circuit complying with appropriate standard specifications. Each of the user control devices 113 and 133 may be realized with one or more appropriate joysticks, keyboards, touch panels, computer mice, tracking balls, mind control devices, a combination of the above devices, or any device that can convert user's intend to control signals/keycodes to user control circuit. Each of the communication circuits 114 and 134 may be realized with a wired networking interface, a wireless networking interface, or a hybrid circuit integrated with the functionalities of the above two interfaces. Each of the processors 116 and 136 may be realized with one or more appropriate computing circuits. Each of the storage circuits 117 and 137 may be realized with an appropriate non-volatile memory circuit. Each of the display devices 120, 140, and 160 may be realized with an appropriate television, a computer screen with associated speakers, a projector device with associated speakers, or any other appropriate audio and video playback device.

Please note that in the video game emulating system 100, the hardware specifications of a functional block of a video game console may be different from that of a corresponding functional block of another video game console. For example, the memories 111 and 131 may have different storage capacities and/or operating frequencies. The transmission circuits 112 and 132 may adopt different audio and video data transmission formats. The user control devices 113 and 133 may have different user command input mechanisms. The communication circuits 114 and 134 may adopt different networking mechanisms. The processors 116 and 136 may have different operating frequencies and/or different number of computing cores. The storage circuits 117 and 137 may have different storage capacities and/or data writing schemes.

Different functional blocks of the video game console 110 may be respectively realized with different circuits, or may be integrated into a single circuit chip. For example, the processor 116 of the control circuit 115 and the storage circuit 117 may be integrated into the same circuit chip. In addition, at least one of the memory 111, the transmission circuit 112, the user control device 113, and the communication circuit 114 may be further integrated into the control circuit 115. Similarly, the processor 136 of the control circuit 135 and the storage circuit 137 may be integrated into the same circuit chip. In addition, at least one of the memory 131, the transmission circuit 132, the user control device 133, and the communication circuit 134 may be further integrated into the control circuit 135.

As described previously, different video game consoles in the video game emulating system 100 may cooperate together through networking connections to conduct emulation operations of a same old fashion standalone multiplayer video game, so as to enable multiple users in different geographical locations (e.g., different rooms, different buildings, different cities, or different countries) to play the same old fashion standalone multiplayer video game together.

In practical applications, the video game consoles in the video game emulating system 100 may be respectively located in different rooms, different buildings, different cities, or different countries. Of course, the video game consoles in the video game emulating system 100 may be arranged at different places within a same indoor space.

In operations, one of the video game consoles in the video game emulating system 100 may be utilized to act the role of a master-side game console while another one or more video game consoles may be utilized to act as one or more client-side game consoles. The master-side game console is responsible for collecting the manipulation data inputted by the players of all video game consoles participating in the video game emulation operations so as to generate corresponding instructions. The master-side game console is also responsible for controlling all participating video game consoles to individually execute the instructions generated by the master-side game console at substantially the same time, so as to present substantially the same game screen to all players in different geographical locations. All of the client-side game consoles would execute the instructions generated by the master-side game console at substantially the same time under the timing control of the master-side game console, so that the game screen rendered by each of the client-side game consoles can be synchronized with the game screen rendered by the master-side game console.

Figure 4:
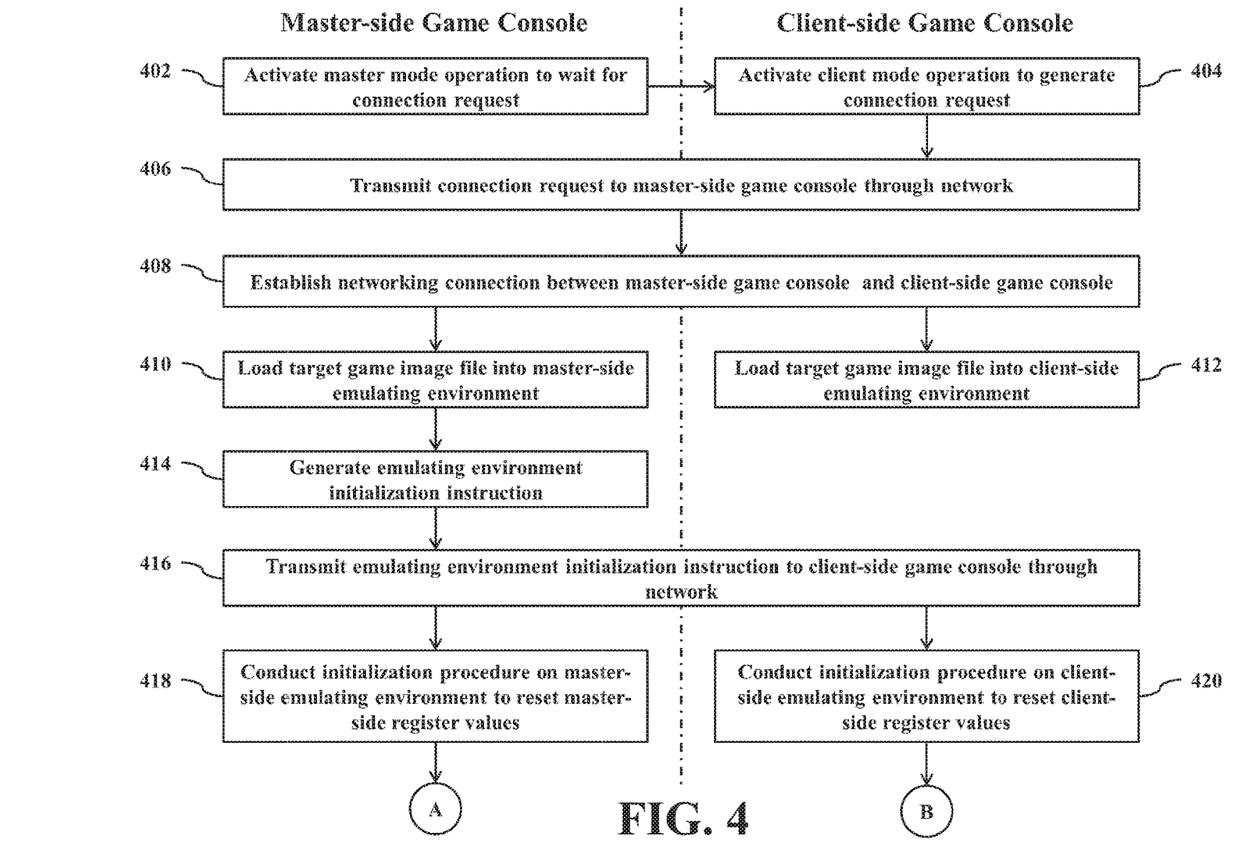
FIGS. 4~5 collectively show a simplified flowchart illustrating a method for emulating a standalone multiplayer video game according to one embodiment of the present disclosure.
Figure 5:
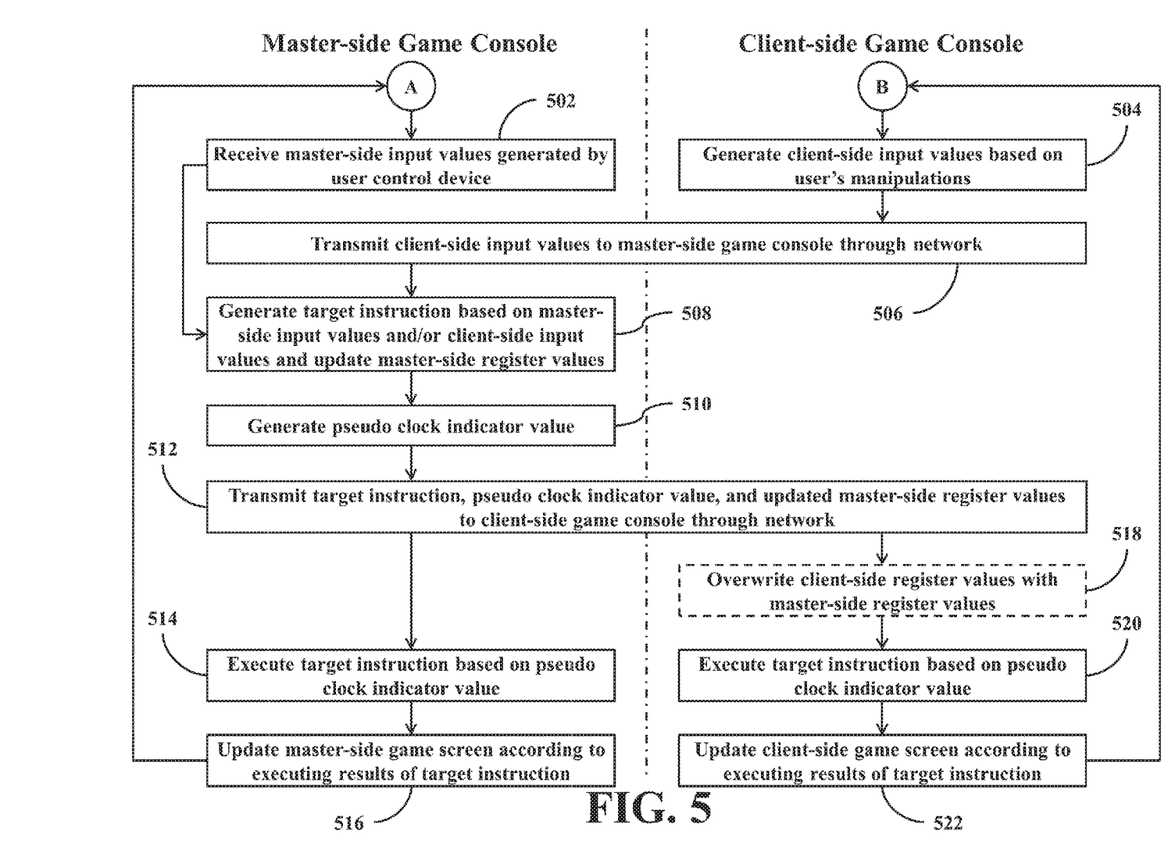

The operations of the video game emulating system 100 will be further described in the following by reference to FIG. 4 and FIG. 5. FIG. 4 and FIG. 5 collectively show a simplified flowchart illustrating a method for emulating a standalone multiplayer video game according to one embodiment of the present disclosure.

In FIG. 4 and FIG. 5, operations within a column under the name of a specific device are operations to be performed by the specific device. For example, operations within a column under the label "master-side game console" are operations to be performed by the video game console acting as a master-side game console, operations within a column under the label "client-side game console" are operations to be performed by the video game console acting as a client-side game console.

For illustrative purpose, it is assumed hereafter that the video game console 110 is the video game console acting the role of a master-side game console while the video game console 130 is the video game console acting the role of a client-side game console. Accordingly, the display device 120 is hereafter referred to as the master-side display device 120 while the display device 140 is hereafter referred to as the client-side display device 140.

When the user of the master-side game console 110 and another user of the client-side game console 130 want to play a specific old fashion multiplayer video game together, one of the two players can manipulate the master-side game console 110 to perform the operation 402 and another player can manipulate the client-side game console 130 to perform the operation 404.

In the operation 402, the networking module 230 of the computer program product 118 stored in the master-side game console 110 may control the processor 116 to activate a master mode operation to wait for connection requests to be transmitted from other client-side game consoles.

In the operation 404, the networking module 330 of the computer program product 138 stored in the client-side game console 130 may control the processor 136 to activate a client mode operation to generate a connection request.

In the operation 406, the networking module 330 of the computer program product 138 may control the processor 136 to instruct the communication circuit 134 to transmit the connection request to the master-side game console 110 through the network.

When the connection request transmitted from the client-side game console 130 through the network is received by the communication circuit 114 of the master-side game console 110, the master-side game console 110 and the client-side game console 130 would perform the operation 408.

In the operation 408, the networking modules 230 and 330 respectively control the processors 116 and 136 to establish a networking connection between the master-side game console 110 and the client-side game console 130 through the communication circuits 114 and 134.

In implementations, the processors 116 and 136 may respectively utilize the communication circuits 114 and 134 to directly conduct various data handshaking procedures and/or identity authentication procedures with each other through the network, to thereby establish the networking connection between the master-side game console 110 and the client-side game console 130.

In another embodiment, the communication circuits 114 and 134 may respectively communicate with a player matching server 190 through the network, and utilize the player matching server 190 as an intermediate device for networking connection, game player matching, and/or subsequent data exchange.

For example, the processors 116 and 136 may respectively utilize the communication circuits 114 and 134 to establish a networking connection between the master-side game console 110 and the client-side game console 130 through the network by adopting various peer-to-peer networking connection mechanisms.

For another example, the networking module 230 may control the processor 116 to request the user of the master-side game console 110 to choose or to input a specific group identification code. When the master-side game console 110 and the client-side game console 130 directly communicate with each other through the network or indirectly communicate with each other through the player matching server 190, the networking module 330 may control the processor 136 to request the user of the client-side game console 130 to choose or to input a group identification code. If the group identification code provided by the client-side game console 130 matches with the specific group identification code provided by the master-side game console 110, the master-side game console 110 or the player matching server 190 may configure the master-side game console 110 and the client-side game console 130 that have the same group identification code to be a same gaming group, and allow the master-side game console 110 and the client-side game console 130 to establish a networking connection with each other.

In the operation 410, the emulator module 250 of the computer program product 118 may control the processor 116 to emulate a hardware operating environment (e.g., creating a virtual central processing unit complying with specific specifications, configuring the values of virtual registers, and the like) of a predetermined old fashion video game console, so as to create a master-side emulating environment (a.k.a. a master-side emulating platform). In the operation 410, the emulator module 250 may further control the processor 116 to load a target game image file into the master-side emulating environment. In practice, the target game image file may be stored in the memory 111 or the storage circuit 117 of the master-side game console 110 in advance.

The term "target game image file" used throughout the description and the claims refers to an archive file containing a target game selected by the user, wherein the target game is an old fashion standalone multiplayer video game as described above. In other words, the target game per se is designed to be incapable of supporting multiple users to play the target game together through networking connections. In implementations, the aforementioned image file may be a compressed file or an uncompressed file.

In the operation 412, the emulator module 350 of the computer program product 138 may control the processor 136 to emulate a hardware operating environment (e.g., creating a virtual central processing unit complying with specific specifications, configuring the values of virtual registers, and the like) of the predetermined old fashion video game console, so as to create a client-side emulating environment (a.k.a. a client-side emulating platform). In the operation 412, the emulator module 350 may further control the processor 136 to load the target game image file into the client-side emulating environment. In practice, the target game image file may be stored in the memory 131 or the storage circuit 137 of the client-side game console 130 in advance.

In implementations, the executing order of the operations 410 and 412 has no particular restriction, and thus the operations 410 and 412 may be performed at the same time or at different points of time.

In the operation 414, the emulator module 250 of the computer program product 118 may control the processor 116 to generate an emulating environment initialization instruction.

In the operation 416, the networking module 230 of the computer program product 118 may control the processor 116 to instruct the communication circuit 114 to transmit the emulating environment initialization instruction to the client-side game console 130 through the network.

In the operation 418, the emulator module 250 may control the processor 116 to conduct an initialization procedure on the master-side emulating environment to reset the values of multiple virtual registers in the master-side emulating environment (hereinafter referred to as master-side register values).

When conducting the video game emulation operations, the pseudo clock control module 220 of the computer program product 118 generates a pseudo clock counter value (hereinafter referred to as a master-side pseudo clock counter value), and the virtual central processing unit (virtual CPU) in the master-side emulating environment created by the processor 116 would carry out the emulation computing based on the master-side pseudo clock counter value generated by the pseudo clock control module 220.

In implementations, the pseudo clock control module 220 of the computer program product 118 may also reset the master-side pseudo clock counter value in the operation 418.

On the other hand, when the emulating environment initialization instruction transmitted from the master-side game console 110 is received by the communication circuit 134 of the client-side game console 130 through the network, the client-side game console 130 performs the operation 420.

In the operation 420, the emulator module 350 may control the processor 136 to conduct an initialization procedure on the client-side emulating environment according to the emulating environment initialization instruction transmitted from the master-side game console 110, so as to reset the values of multiple virtual registers in the client-side emulating environment (hereinafter referred to as client-side register values).

When conducting the video game emulation operations, the pseudo clock control module 320 of the computer program product 138 generates a pseudo clock counter value (hereinafter referred to as a client-side pseudo clock counter value), and the virtual central processing unit (virtual CPU) in the client-side emulating environment created by the processor 136 would carry out the emulation computing based on the client-side pseudo clock counter value generated by the pseudo clock control module 320.

In practice, the pseudo clock control module 320 of the computer program product 138 may also reset the client-side pseudo clock counter value in the operation 420 according to the emulating environment initialization instruction transmitted from the master-side game console 110, so as to substantially synchronize the client-side pseudo clock counter value with the master-side pseudo clock counter value.

When the user of the master-side game console 110 manipulates the user control device 113 to issue related game commands, the master-side game console 110 performs the operation 502. When the user of the client-side game console 130 manipulates the user control device 133 to issue related game commands, the client-side game console 130 performs the operation 504.

In the operation 502, the user control device 113 of the master-side game console 110 generates one or more input values (hereinafter referred to as master-side input values) based on its user's manipulations. For example, the master-side input values may comprise one or more keycodes, button codes, axis codes of joystick, and/or joystick vectors. In this situation, the user command receiving module 240 of the computer program product 118 would control the processor 116 to receive the one or more master-side input values generated by the user control device 113.

In the operation 504, the user control device 133 of the client-side game console 130 generates one or more input values (hereinafter referred to as client-side input values) based on its user's manipulations. For example, the client-side input values may comprise one or more keycodes, button codes, axis codes of joystick, and/or joystick vectors. In this situation, the user command receiving module 340 of the computer program product 138 would control the processor 136 to receive the one or more client-side input values generated by the user control device 133.

In practice, the executing order of the operations 502 and 504 has no particular restriction, and it does not require the operations 502 and 504 should be performed at the same time.

In the operation 506, the networking module 330 of the computer program product 138 may control the processor 136 to utilize the communication circuit 134 to transmit the one or more client-side input values to the master-side game console 110 through the network.

When the one or more client-side input values transmitted from the client-side game console 130 through the network is received by the communication circuit 114 of the master-side game console 110, the master-side game console 110 performs the operation 508.

In the operation 508, the emulator module 250 of the computer program product 118 controls the processor 116 to generate a target instruction based on the one or more master-side input values and/or the one or more client-side input values. If necessary, the emulator module 250 may also update the one or more master-side register values in the master-side emulating environment based on the one or more master-side input values and/or the one or more client-side input values.

In the operation 510, the pseudo clock control module 220 of the computer program product 118 generates a pseudo clock indicator value corresponding to the next master-side pseudo clock counter value.

In the operation 512, the networking module 230 of the computer program product 118 controls the processor 116 to utilize the communication circuit 114 to transmit the target instruction and/or the pseudo clock indicator value to the client-side game console 130 through the network. If the emulator module 250 updates the one or more master-side register values in the master-side emulating environment in the aforementioned operation 508, the processor 116 may also utilize the communication circuit 114 to transmit one or more updated master-side register values to the client-side game console 130 through the network in the operation 512.

In practice, the processor 116 may transmit all master-side register values to the client-side game console 130 in the operation 512. Alternatively, the processor 116 may merely transmit the newly updated master-side register values to the client-side game console 130 in the operation 512 so as to reduce the data amount to be transmitted from the master-side game console 110 to the client-side game console 130.

Accordingly, the communication circuit 134 of the client-side game console 130 may receive the target instruction, the pseudo clock indicator value, and/or one or more updated master-side register values transmitted from the master-side game console 110 in the operation 512.

In the operation 514, the emulator module 250 of the computer program product 118 controls the processor 116 to fetch and execute the target instruction based on the pseudo clock indicator value. For example, the emulator module 250 may control the virtual CPU in the master-side emulating environment to fetch the target instruction when the master-side pseudo clock counter value reaches a first predetermined counter value corresponding to the pseudo clock indicator value, and then controls the virtual CPU in the master-side emulating environment to execute the target instruction when the master-side pseudo clock counter value reaches a second predetermined counter value.

In the operation 516, the video and audio processing module 210 of the computer program product 118 updates the game screen to be displayed on the master-side display device 120 (hereinafter referred to as the master-side game screen) and generates corresponding sound effects according to the executing results of the target instruction. For example, the video and audio processing module 210 may render an updated master-side game screen according to the executing results of the target instruction, and control the processor 116 to transmit the updated master-side game screen to the master-side display device 120 through the transmission circuit 112 so as to display the updated master-side game screen on the master-side display device 120.

As shown in FIG. 5, the master-side game console 110 may repeat the corresponding operations in FIG. 5 under control of the computer program product 118 to continue the subsequent emulation operations of the target game.

On the other hand, if the master-side game console 110 transmits one or more updated master-side register values to the client-side game console 130 in the operation 512, then the client-side game console 130 would perform the operation 518.

In the operation 518, the emulator module 350 of the computer program product 138 controls the processor 136 to overwrite one or more client-side register values in the client-side emulating environment with the one or more updated master-side register values transmitted from the master-side game console 110.

If the master-side game console 110 transmits all master-side register values to the client-side game console 130 in the operation 512, then the emulator module 350 may overwrite all client-side register values in the operation 518.

If the master-side game console 110 merely transmits some newly updated master-side register values to the client-side game console 130 in the operation 512, then the emulator module 350 may merely overwrite some corresponding client-side register values in the operation 518.

In the operation 520, the emulator module 350 of the computer program product 138 controls the processor 136 to fetch and execute the target instruction transmitted from the master-side game console 110 based on the pseudo clock indicator value transmitted from the master-side game console 110. For example, the emulator module 350 may control the virtual CPU in the client-side emulating environment to fetch the target instruction when the client-side pseudo clock counter value reaches a first predetermined counter value corresponding to the pseudo clock indicator value, and then control the virtual CPU in the client-side emulating environment to execute the target instruction when the client-side pseudo clock counter value reaches a second predetermined counter value.

In the operation 522, the video and audio processing module 310 of the computer program product 138 updates the game screen to be displayed on the client-side display device 140 (hereinafter referred to as the client-side game screen) and generates corresponding sound effects according to the executing results of the target instruction. For example, the video and audio processing module 310 may render an updated client-side game screen according to the executing results of the target instruction, and control the processor 136 to transmit the updated client-side game screen to the client-side display device 140 through the transmission circuit 132 so as to display the updated client-side game screen on the client-side display device 140.

In other words, the client-side game screen is independently generated by the client-side display device 140 according to the target instruction, and the master-side game console 110 does not transmit the master-side game screen to the client-side game console 130 to be the client-side game screen.

As shown in FIG. 5, the client-side game console 130 may repeat the corresponding operations in FIG. 5 under control of the computer program product 138 to continue the subsequent emulation operations of the target game.

As can be appreciated from the foregoing descriptions, the target instruction to be executed by the virtual CPU in the client-side emulating environment created by the processor 136 is generated by the emulator module 250 in the master-side game console 110, and not generated by the emulator module 350 in the client-side game console 130.

In addition, it can be appreciated that the operating clock of the virtual CPU in the client-side emulating environment created by the processor 136 is not independently controlled by the pseudo clock control module 320 in the client-side game console 130. Instead, the operating clock of the virtual CPU in the client-side emulating environment created by the processor 136 is indirectly controlled by the pseudo clock indicator value generated by the pseudo clock control module 220 in the master-side game console 110.

Therefore, the virtual CPU in the master-side emulating environment of the master-side game console 110 and the virtual CPU in the client-side emulating environment of the client-side game console 130 both fetch the same target instruction at a substantially same first point of time and both execute the same target instruction at a substantially same second point of time.

Please note that the client-side game screen to be displayed on the client-side display device 140 is independently generated by the client-side game console 130, and thus the master-side game console 110 does not need to transmit the master-side game screen to the client-side game console 130 to be the synchronization basis of the emulation operation of the video game.

Due to the progress of the modern technology, the operating frequencies of the processors 116 and 136 in the master-side game console 110 and the client-side game console 130 are far faster than the operating frequencies of the virtual CPU in the emulating environments created by the emulator modules 250 and 350. On the other hand, the time required for exchanging the aforementioned data between the master-side game console 110 and the client-side game console 130 using modern networking technologies is far less than the time required for the virtual CPUs in the emulating environments created by the emulator modules 250 and 350 to execute each instruction. Accordingly, the time required for the virtual CPUs in the emulating environments created by the emulator modules 250 and 350 to execute one instruction is sufficient for the master-side game console 110 and the client-side game console 130 to conduct hundreds or even thousands times of data exchange.

Therefore, although the operating timing control of the virtual CPU in the client-side emulating environment created by the processor 136 and the target instruction to be executed are generated by the emulator module 250 of the master-side game console 110 and then transmitted to the client-side game console 130, but the game emulation operations conducted by the master-side game console 110 and the client-side game console 130 are substantially synchronized with each other. As a result, the game screens displayed on the master-side display device 120 and the client-side display device 140 and related sound effects are substantially synchronized with each other from the perspective of normal users, and thus no obvious time lag will be perceived by the users.

Please note that the executing order of the operations illustrated in FIG. 4 and FIG. 5 is merely an exemplary embodiment, rather than a restriction to practical implementations. For example, the connection request in the operation 406 may be instead generated by the master-side game console 110 and then transmitted to the client-side game console 130 from the master-side game console 110 through the network.

The executing order of the operations 508 and 510 may be swapped with each other. The operation 510 may be instead performed before the operation 502 or 506, or may be performed at the same time as the operation 502 or 508.

In addition, the master-side game console 110 may not transmit updated master-side register values to the client-side game console 130 at each time the master-side game console 110 transmits data to the client-side game console 130, and thus the operation 518 may be sometimes omitted.

Furthermore, the previous embodiment takes the cooperation between two video game consoles 110 and 130 as an example to describe related operations, but the method for emulating a standalone multiplayer video game illustrated in FIG. 4 and FIG. 5 can also be applied in other applications where more client-side video game consoles are employed to participate the emulation operations of the old fashion standalone multiplayer video game.

In can be appreciated from the foregoing descriptions that the disclosed video game emulating system 100 enables multiple video game consoles to conduct emulation operations of the same old fashion standalone multiplayer video game through networking connections, so as to allow multiple players in different geographical locations (e.g., different rooms, different buildings, different cities, or different countries) to play the same old fashion standalone multiplayer video game together.

In addition, since the master-side game console 110 does not need to transmit the image data of the master-side game screen to the client-side game console 130, the data amount to be transmitted from the master-side game console 110 to the client-side game console 130 can be significantly reduced, thereby effectively avoiding perceivable time lag between the game screen of the master-side game console 110 and the game screen of the client-side game console 130.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit (115) of a master-side game console (110), wherein the master-side game console (110) comprises a transmission circuit (112), an user control device (113), and a communication circuit (114), the control circuit (115) comprising:
   a processor (116); and
   a storage circuit (117) arranged to operably store a computer program product (118);
   wherein the processor (116) is arranged to operably execute the computer program product (118) to perform following operations:
   establishing a networking connection between the master-side game console (110) and a remote client-side game console (130) through the communication circuit (114);
   loading a target game image file into a master-side emulating environment created by the processor (116);
   receiving one or more master-side input values generated by the user control device (113) based on an user's manipulations;

receiving one or more client-side input values transmitted from the client-side game console (130) through a network;

generating a target instruction based on the one or more master-side input values and the one or more client-side input values;

generating a pseudo clock indicator value;

utilizing the communication circuit (114) to transmit the target instruction and the pseudo clock indicator value to the client-side game console (130) through the network;

executing the target instruction in the master-side emulating environment based on the pseudo clock indicator value; and rendering an updated master-side game screen according to executing results of the target instruction and transmitting the updated master-side game screen to a master-side display device (120) for displaying through the transmission circuit (112).

2. The control circuit (115) of claim 1, wherein a target game contained in the target game image file is a standalone multiplayer video game, and the target game per se is designed to be incapable of supporting multiple users to play the target game together through networking connections.

3. The control circuit (115) of claim 2, wherein the processor (116) is arranged to operably establish the networking connection between the master-side game console (110) and the client-side game console (130) after the communication circuit (114) receives a connection request transmitted from the client-side game console (130) through the network.

4. The control circuit (115) of claim 2, wherein the processor (116) is further arranged to operably execute the computer program product (118) to perform following operation:

conducting an initialization procedure on the master-side emulating environment to reset multiple master-side register values.

5. The control circuit (115) of claim 2, wherein the processor (116) is further arranged to operably execute the computer program product (118) to perform following operations:

updating one or more master-side register values in the master-side emulating environment according to the one or more master-side input values and the one or more client-side input values; and utilizing the communication circuit (114) to transmit one or more updated master-side register values to the client-side game console (130) through the network.

6. The control circuit (115) of claim 5, wherein the client-side game console (130) is arranged to operably overwrite one or more client-side register values in a client-side emulating environment created by the client-side game console (130) with the one or more updated master-side register values.

7. The control circuit (115) of claim 2, wherein the processor (116) is further arranged to operably execute the computer program product (118) to perform following operation:

utilizing the communication circuit (114) to transmit an emulating environment initialization instruction to the client-side game console (130) through the network;

wherein the client-side game console (130) is arranged to operably load the target game image file into a client-side emulating environment created by the client-side game console (130), and to operably conduct an initialization procedure on the client-side emulating environment to reset multiple client-side register values after receiving the emulating environment initialization instruction transmitted from the communication circuit (114).

8. The control circuit (115) of claim 2, wherein the client-side game console (130) is arranged to operably execute the target instruction in a client-side emulating environment created by the client-side game console (130) based on the pseudo clock indicator value, to operably render an updated client-side game screen according to executing results of the target instruction, and to operably transmit the updated client-side game screen to a client-side display device (140) for displaying.

* * * * *